(12) United States Patent
Weir et al.

(10) Patent No.: US 8,788,109 B2
(45) Date of Patent: Jul. 22, 2014

(54) UTILITY GRID POWER AVERAGING AND CONDITIONING

(75) Inventors: Richard D. Weir, Cedar Park, TX (US); Carl W. Nelson, Cedar Park, TX (US)

(73) Assignee: EEStor, Inc., Cedar Park, TX (US)

( * ) Notice: Subject to any disclaimer, the term of this patent is extended or adjusted under 35 U.S.C. 154(b) by 212 days.

(21) Appl. No.: 13/401,136

(22) Filed: Feb. 21, 2012

(65) Prior Publication Data

US 2012/0146418 A1 Jun. 14, 2012

Related U.S. Application Data

(60) Division of application No. 12/785,380, filed on May 21, 2010, now Pat. No. 8,145,362, and a continuation-in-part of application No. 11/499,594, filed on Aug. 4, 2006, now Pat. No. 7,729,811.

(60) Provisional application No. 61/180,311, filed on May 21, 2009, provisional application No. 61/297,470, filed on Jan. 22, 2010.

(51) Int. Cl.
*G06F 19/00* (2011.01)
*H02J 7/34* (2006.01)
*H01G 4/30* (2006.01)
*H02J 3/32* (2006.01)

(52) U.S. Cl.
CPC .. *H02J 7/345* (2013.01); *H02J 3/32* (2013.01); *H01G 4/302* (2013.01)
USPC ........... 700/295; 700/286; 700/292; 320/166; 361/313

(58) Field of Classification Search
CPC ............. H02J 3/32; H02J 7/345; H01G 3/302
USPC .............. 700/295; 307/64; 320/166; 361/313
See application file for complete search history.

(56) References Cited

U.S. PATENT DOCUMENTS

| 3,947,553 A | 3/1976 | Moss et al. |
| 4,054,598 A | 10/1977 | Blum et al. |

(Continued)

FOREIGN PATENT DOCUMENTS

| CA | 02598787 A1 | 3/2008 |
| CA | 02598754 A1 | 4/2008 |

(Continued)

OTHER PUBLICATIONS

Bruno et al., "High-Performance Multilayer Capacitor Dielectrics from Chemically Prepared Powders", Journal of the American Ceramic Society, vol. 76, No. 5, pp. 1233-1241, 1993.

(Continued)

*Primary Examiner* — Michael D Masinick
(74) *Attorney, Agent, or Firm* — Abel Law Group, LLP

(57) ABSTRACT

A power system can include an input configured to be coupled to a utility grid. The power system can further include an electrical energy storage unit comprising a dielectric layer disposed between first and second electrode layers, the dielectric layer comprising a high permittivity ceramic material. In an embodiment, the power system can include a control computer can control a first switch to deactivate a main electrical energy storage unit that includes the electrical energy storage unit, and to control the second switch to activate a backup energy storage unit. In a further embodiment, the power system can include an output coupled to the utility power grid. In a further embodiment, the power system can include a control computer to control a first switch to deactivate a main electrical energy storage unit, and to control a second switch to activate an electrical energy storage unit buffer.

14 Claims, 3 Drawing Sheets

(56) References Cited

U.S. PATENT DOCUMENTS

| | | |
|---|---|---|
| 4,408,282 A | 10/1983 | Hof |
| 4,671,618 A | 6/1987 | Wu et al. |
| 4,733,328 A | 3/1988 | Blazej |
| 4,772,576 A | 9/1988 | Kimura et al. |
| 4,834,952 A | 5/1989 | Rollat et al. |
| 4,839,339 A | 6/1989 | Bunker et al. |
| 5,011,804 A | 4/1991 | Bergna et al. |
| 5,017,446 A | 5/1991 | Reichman et al. |
| 5,043,843 A | 8/1991 | Kimura et al. |
| 5,045,170 A | 9/1991 | Bullock et al. |
| 5,082,811 A | 1/1992 | Bruno |
| 5,087,437 A | 2/1992 | Bruno et al. |
| 5,116,560 A | 5/1992 | Dole et al. |
| 5,116,790 A | 5/1992 | Bruno et al. |
| 5,196,388 A | 3/1993 | Shyu |
| 5,242,674 A | 9/1993 | Bruno et al. |
| 5,252,311 A | 10/1993 | Riman et al. |
| 5,340,510 A | 8/1994 | Bowen |
| 5,362,472 A | 11/1994 | Lauter et al. |
| 5,407,618 A | 4/1995 | Stephenson |
| 5,417,956 A | 5/1995 | Moser |
| 5,631,814 A * | 5/1997 | Zak ................... 363/37 |
| 5,711,988 A | 1/1998 | Tsai et al. |
| 5,730,874 A | 3/1998 | Wai et al. |
| 5,731,948 A | 3/1998 | Yializis et al. |
| 5,738,919 A | 4/1998 | Thomas et al. |
| 5,744,258 A | 4/1998 | Bai et al. |
| 5,776,239 A | 7/1998 | Bruno |
| 5,797,971 A | 8/1998 | Zheng et al. |
| 5,800,857 A | 9/1998 | Ahmad et al. |
| 5,833,905 A | 11/1998 | Miki |
| 5,850,113 A | 12/1998 | Weimer et al. |
| 5,867,363 A | 2/1999 | Tsai et al. |
| 5,900,223 A | 5/1999 | Matijevic et al. |
| 5,929,259 A | 7/1999 | Lockemeyer |
| 5,973,175 A | 10/1999 | Bruno |
| 5,973,913 A | 10/1999 | McEwen et al. |
| 6,005,764 A | 12/1999 | Anderson et al. |
| 6,072,688 A | 6/2000 | Hennings et al. |
| 6,078,494 A | 6/2000 | Hansen |
| 6,195,249 B1 | 2/2001 | Honda et al. |
| 6,228,161 B1 | 5/2001 | Drummond |
| 6,243,254 B1 | 6/2001 | Wada et al. |
| 6,268,054 B1 | 7/2001 | Costantino et al. |
| 6,294,620 B1 | 9/2001 | Huang et al. |
| 6,296,716 B1 | 10/2001 | Haerle et al. |
| 6,331,929 B1 | 12/2001 | Masuda |
| 6,352,681 B1 | 3/2002 | Horikawa et al. |
| 6,410,157 B1 | 6/2002 | Nakamura et al. |
| 6,447,910 B1 | 9/2002 | Wataya |
| 6,485,591 B1 | 11/2002 | Nakao et al. |
| 6,501,639 B2 | 12/2002 | Takafuji et al. |
| 6,550,117 B1 | 4/2003 | Tokuoka et al. |
| 6,673,274 B2 | 1/2004 | Venigalla et al. |
| 6,692,721 B2 | 2/2004 | Hur et al. |
| 6,703,719 B1 | 3/2004 | McConnell |
| 6,715,197 B2 | 4/2004 | Okuyama et al. |
| 6,749,898 B2 | 6/2004 | Nakamura et al. |
| 6,905,989 B2 | 6/2005 | Ellis et al. |
| 7,033,406 B2 * | 4/2006 | Weir et al. ................ 29/623.5 |
| 7,068,898 B2 | 6/2006 | Buretea et al. |
| 7,228,050 B1 | 6/2007 | Buretea et al. |
| 7,237,634 B2 | 7/2007 | Severinsky et al. |
| 7,446,536 B2 | 11/2008 | Bertness |
| 7,456,602 B2 | 11/2008 | Hampo et al. |
| 7,595,109 B2 * | 9/2009 | Weir et al. ................ 428/403 |
| 7,629,699 B2 * | 12/2009 | Annen et al. ................ 290/1 A |
| 7,648,687 B1 | 1/2010 | Weir et al. |
| 7,729,811 B1 * | 6/2010 | Weir et al. ................ 700/295 |
| 7,919,879 B2 | 4/2011 | Flannery et al. |
| 7,993,611 B2 | 8/2011 | Weir et al. |
| 8,264,208 B2 * | 9/2012 | Wardensky ................ 320/166 |
| 2001/0010367 A1 | 8/2001 | Burnell-Jones |
| 2002/0186522 A1 | 12/2002 | Honda et al. |
| 2003/0025397 A1 | 2/2003 | Young et al. |
| 2003/0052658 A1 | 3/2003 | Baretich et al. |
| 2004/0071944 A1 | 4/2004 | Weir et al. |
| 2004/0135436 A1 | 7/2004 | Gilbreth et al. |
| 2005/0105229 A1 | 5/2005 | Deng et al. |
| 2006/0210779 A1 | 9/2006 | Weir et al. |
| 2007/0148065 A1 | 6/2007 | Weir et al. |
| 2007/0158945 A1 * | 7/2007 | Annen et al. ................ 290/1 A |
| 2008/0016681 A1 | 1/2008 | Eisenring |
| 2008/0313006 A1 | 12/2008 | Witter et al. |
| 2009/0326729 A1 | 12/2009 | Hakim et al. |

FOREIGN PATENT DOCUMENTS

| | | |
|---|---|---|
| EP | 1020487 A1 | 7/2000 |
| JP | 55154321 | 12/1980 |
| JP | 63248719 | 10/1988 |
| JP | 01179721 A | 7/1989 |
| JP | 03068102 A | 3/1991 |
| JP | 05017150 A | 1/1993 |
| JP | 07291607 A | 11/1995 |
| JP | 11147716 A | 6/1999 |
| JP | 2003192343 | 7/2003 |
| WO | 93/16012 A1 | 8/1993 |
| WO | 2008031189 A1 | 3/2008 |
| WO | 2008031189 B1 | 3/2008 |
| WO | 2008040114 A1 | 4/2008 |

OTHER PUBLICATIONS

J. Kuwata et al., "Electrical Properties of Perovskite-Type Oxide Thin-Films Prepared by RF Sputtering", Jpn J. Appl. Phys., Part 1, 1985, 413-15.

F. Sears et al., "Capacitance-Properties of Dielectrics", University of Physica, Addison Wesley Publishing Company, Inc., Feb. 1984, pp. 516-533.

Mitsubishi Polyester Film Corporation specification sheet for Hostaphan (R) RE film for capacitors, Copyright 2007.

Beheir et al., "Studies on the liquid-liquid extraction and ion and precipitate flotation of Co(II) with decanoic acid", Journal of Radioanalytical and Nuclear Chemistry, Articles, vol. 174m,No. 1 (1992) 13-22.

* cited by examiner

# UTILITY GRID POWER AVERAGING AND CONDITIONING

CROSS-REFERENCE TO RELATED APPLICATIONS

This application is a divisional of and claims priority under 35 U.S.C. §120 to U.S. patent application Ser. No. 12/785,380 entitled "Utility Grid Power Averaging and Condition," by Weir et al., filed May 21, 2010, which claims priority under 35 U.S.C. §119(e) to U.S. Patent Application No. 61/180,311 entitled "Utility Grid Power Averaging and Conditioning," by Weir et al., filed May 21, 2009 and, U.S. Patent Application No. 61/297,470 entitled "Utility Grid Power Averaging and Conditioning," by Weir et al., filed Jan. 22, 2010, and is a continuation-in-part of and claims priority under 35 U.S.C. §120 to U.S. patent application Ser. No. 11/499,594 entitled "Systems and Methods For Utility Grid Power Averaging, Long Term Uninterruptible Power Supply, Power Line Isolation From Noise and Transients and Intelligent Power Transfer On Demand," by Weir et al., filed Aug. 4, 2006. All applications listed in this paragraph are assigned to the current assignee hereof and incorporated herein by reference in their entireties.

FIELD OF THE DISCLOSURE

This disclosure relates generally to circuitry and methods for providing power averaging for utility grids.

BACKGROUND

The most common method of providing line isolation and utility grid primary power backup is the use of uninterrupted power systems (UPS) as a secondary power source for providing sufficient power duration until motor generator units are running and the power stabilized. Such a system can provide utility-grid primary power backup, as indicated in FIG. 1. Common types of motor generator units are internal combustion engines (ICs), gas turbines (GTs), and microturbines (MTs). Each of these types of motor generator units have finite start up times and other issues as indicated in Table I. The negative issues of motor generators as indicated in Table I are the high unit cost, high fuel consumption cost, low electrical efficiencies, high operating and maintenance costs (O&M), and environmental issues associated with their emissions.

Other hidden costs involved in the installation of motor generators for primary power utility-grid power backup include expenses and length of time to obtain permits for these power sources. Concerns about environmental issues make obtaining such permits more difficult and in some areas around the world, impossible.

TABLE I

Characteristics of Motor Generator Technologies

| Technology | Internal Combustion (IC) Engine | Gas Turbines (GT) | Microturbines (MT) |
|---|---|---|---|
| Cost: | | | |
| Unit Cost ($/kW) | 300-900 | 300-1000 | 700-1100 |
| O&M Cost ($/kWh) | 0.007-0.015 | 0.004-0.010 | 0.005-0.016 |

TABLE I-continued

Characteristics of Motor Generator Technologies

| Technology | Internal Combustion (IC) Engine | Gas Turbines (GT) | Microturbines (MT) |
|---|---|---|---|
| Other Characteristics: | | | |
| Fuel Type | Natural gas | Natural gas | Natural gas |
| Equipment life | 20 years | 20 years | 10 years |
| Start-up times (cold start) | 10 secs | 10 mins | 2-5 mins |
| Electrical efficiency | 30-37% | 22-37% | 23-28% |
| Available (%) | 91.2-95.8 | 90-93.3 | 95 |
| Emissions: | | | |
| NOx (lb/MWh) | 4.7 | 1.15 | 0.44 |
| SOx (lb/MWh) | 0.454 | 0.008 | 0.008 |
| PM-10 (lb/MWh) | 0.78 | 0.08 | 0.09 |

UPS systems conventionally use stored energy as a secondary power source to protect critical loads and provide sufficient time to switch motor generators on-line to assure limited loss in power to the user when utility grid power is lost. The reliability of such stored energy is fundamental to the reliability of the system. Lead-acid batteries are the most commonly used type of stored energy in UPS systems. For a variety of reasons, including their ability to sustain deep charge/discharge cycles, as compared to common lead-acid batteries, Valve-Regulated Lead-Acid (VRLA) batteries are predominantly used. But despite battery manufacturers' best efforts to improve their products, experience has shown that the useful life of a VRLA battery array in conventional double-conversion UPS systems is two to three years. Beyond two years cell failure rates quickly reach unacceptable levels.

Electrochemical batteries prematurely reach end of life for two reasons: manufacturing defects and battery management issues. Manufacturing defects include "cold" welds between adjacent cells; inter-cell shorts; reversed plates; incomplete casting of the "straps," which results in "dropped" plates; defects in paste mixing, which leads to poor paste adhesion; and contamination of the paste or electrode. Detecting defects in batteries after assembly is very difficult and expensive. Quality cannot practically be inspected-in after construction.

To overcome such problems of lead-acid batteries, a battery management strategy is tailored to the type of battery and its application. VRLA batteries in conventional double-conversion UPS systems, as indicated in FIG. 2, have limitations in the degrees of freedom that can be employed for battery management. Batteries in such systems are always "float" charged. That is, they are continuously supplied with a low charging voltage, in the range of 13.4 to 13.6 volts per jar, as a result of their connection to the DC bus of the rectifier/inverter combination, which is always active. The circuit topology also provides a level of DC ripple current which continuously flows in the batteries from the rectification/inversion process. As a result, a significant amount of heat is continuously generated in the batteries. VRLA batteries employ Absorbed Glass Mat (AGM) or gel electrolyte technology, in which the electrolyte is not free to move, making heat removal more difficult.

In contrast, some systems utilize maintenance-free flooded lead-acid batteries made with lead-calcium grids, in an off-line circuit topology that does not subject the battery string to continuous float charging or ripple currents. Batteries are not subjected to a continuous float charge. Instead they are periodically recharged by means of two different regimens: normal charge and equalize charge.

Temperature control is of concern in a battery management strategy. High temperature accelerates corrosion that destroys a battery's capacity to generate current.

Limiting the depth of discharge is utilized in controlling electrolyte stratification in flooded lead-acid batteries. Stratification is the increase of electrolyte specific gravity at the bottom of the battery.

Stratification can also be reduced by agitating the electrolyte. In vehicle applications, agitation occurs naturally with the movement of the vehicle. In stationary applications, agitation can be accomplished by periodically "gassing" the battery, by raising the charging voltage to the level where electrolysis of water occurs and hydrogen and oxygen gases are created within the electrolyte. The gas bubbles, moving through the electrolyte, provide a stifling action. The technique for providing this function is called equalize-charging which is used to replenish the energy losses in the battery due to self-discharge and operate the control function of the battery management system. However, if the equalize-charge process is performed too frequently, the oxygen generated from electrolysis can accelerate positive grid plate oxidation. Such oxidation can cause the plates to "grow" and short to the negative straps causing battery failure. Another reason to control the number of equalize charges is electrolysis of the water during each charging process diminishes the amount of water in the electrolyte, which can also lead to battery failure.

Other problems associated with lead-acid battery technology include low energy density, typically 70.2 W·h/L; low specific energy, typically 46.0 W·h/kg; high discharge rate; high life reduction with deep cycle use; high energy storage reduction with temperature; and it contains hazardous material.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

Reference will now be made in detail to the preferred embodiments of the invention. While the invention will be described in conjunction with the preferred embodiment, it will be understood that they are not intended to limit the invention to those embodiments. On the contrary, the invention is intended to cover alternatives, modification, and equivalents, which may be included within the scope of the invention as defined by the claims.

Capacitive electrical energy storage unit (EESU) technology and a unique system architecture utilizing this unit with associated hardware and software may provide 1) primary energy storage for power averaging, 2) line isolation from transients and noise, 3) protection against utility grid power loss, 4) on-line primary energy storage incremental increases, 5) limited emission of environmentally hazardous products, liquids, or gasses, 6) a totally green product, 7) at a cost competitive with any primary utility-grid backup technology, or any combination thereof.

The electrical energy storage unit (EESU) may include the enabling technology for providing the primary on-line energy storage capability. Whereas lead-acid battery technology, with its restrictive capabilities is limited to secondary utility-grid energy storage as indicated in the following Table II.

TABLE II

COMPARISON BETWEEN THE EESU AND LEAD-ACID BATTERY

|  | EESU | LEAD-ACID |
|---|---|---|
| Energy Density, W · h/L | >752 | 70.2 |
| Specific Energy, W · h/kg | >495 | 46.0 |
| Specific Energy, W/kg | *>10,000 | 150 |
| High Discharge Rate | No | Yes |
| Life Reduction with Deep Cycle Use | No | High |
| Energy Storage Reduction with Temperature | Very Low | Very High |
| Contains Hazardous Material | No | Yes |
| Requires Battery Management System | No | Yes |
| Requires Battery Stratification | No | Yes |

* EESU power delivery is only restricted by the electronic circuits due to the extremely low dc internal resistance (21.2 μΩ)

Figure 1:
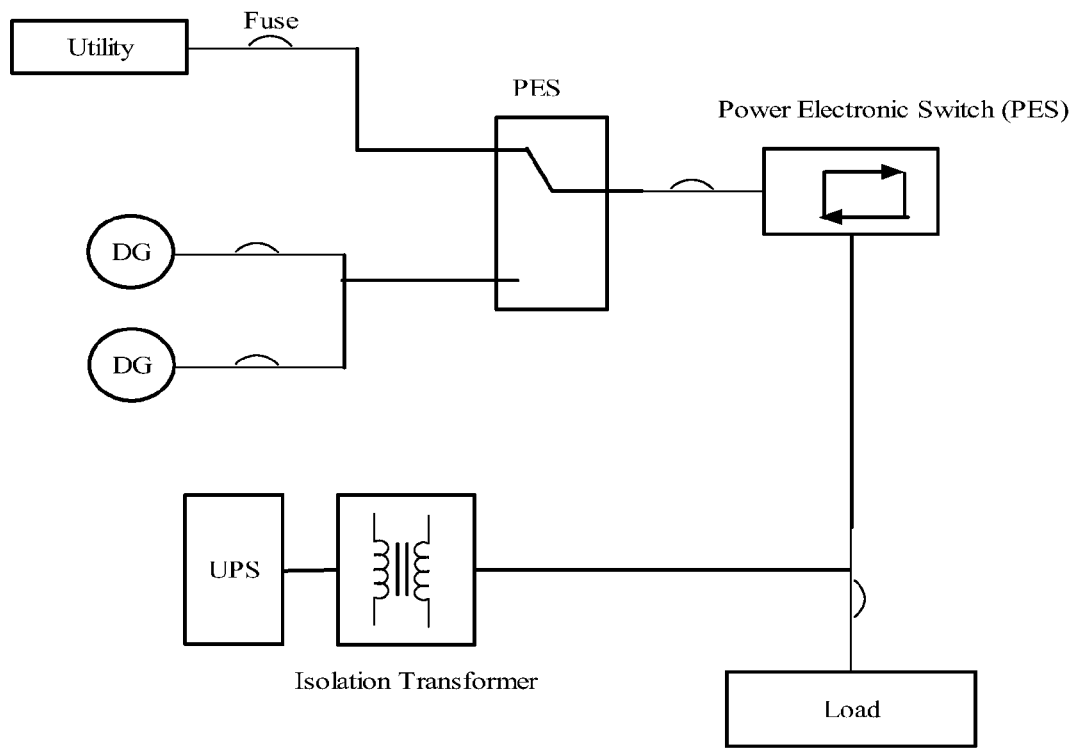
FIG. 1 is a configuration of on-site motor generator utility grid power backup with UPS secondary power assistance that can be used in this combination to provide improved power reliability.
Figure 2:
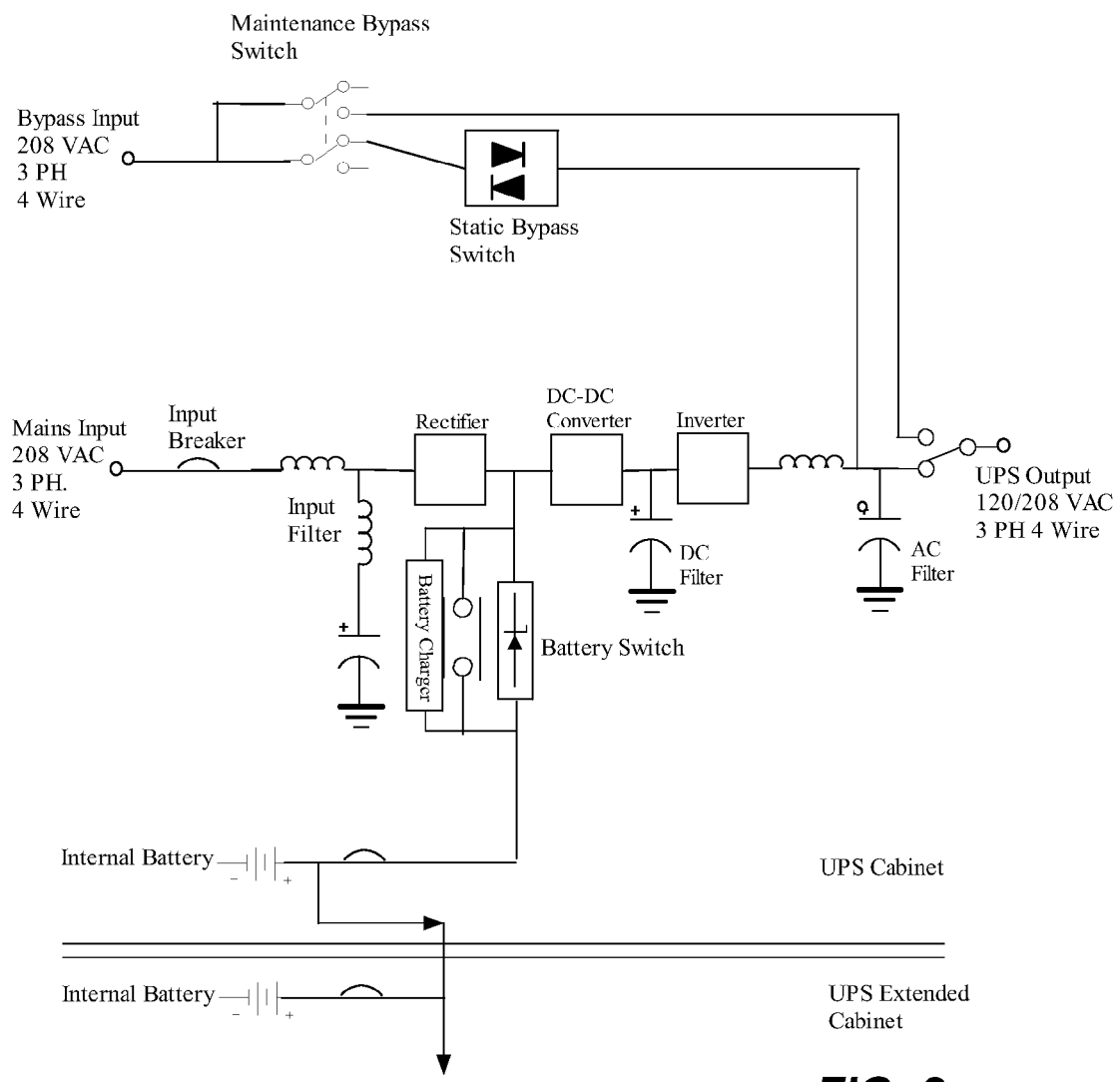
FIG. 2 is a traditional double conversion UPS online operation wherein the internal battery is only used for seamless switching from utility grid power to external AC power.
Figure 3:
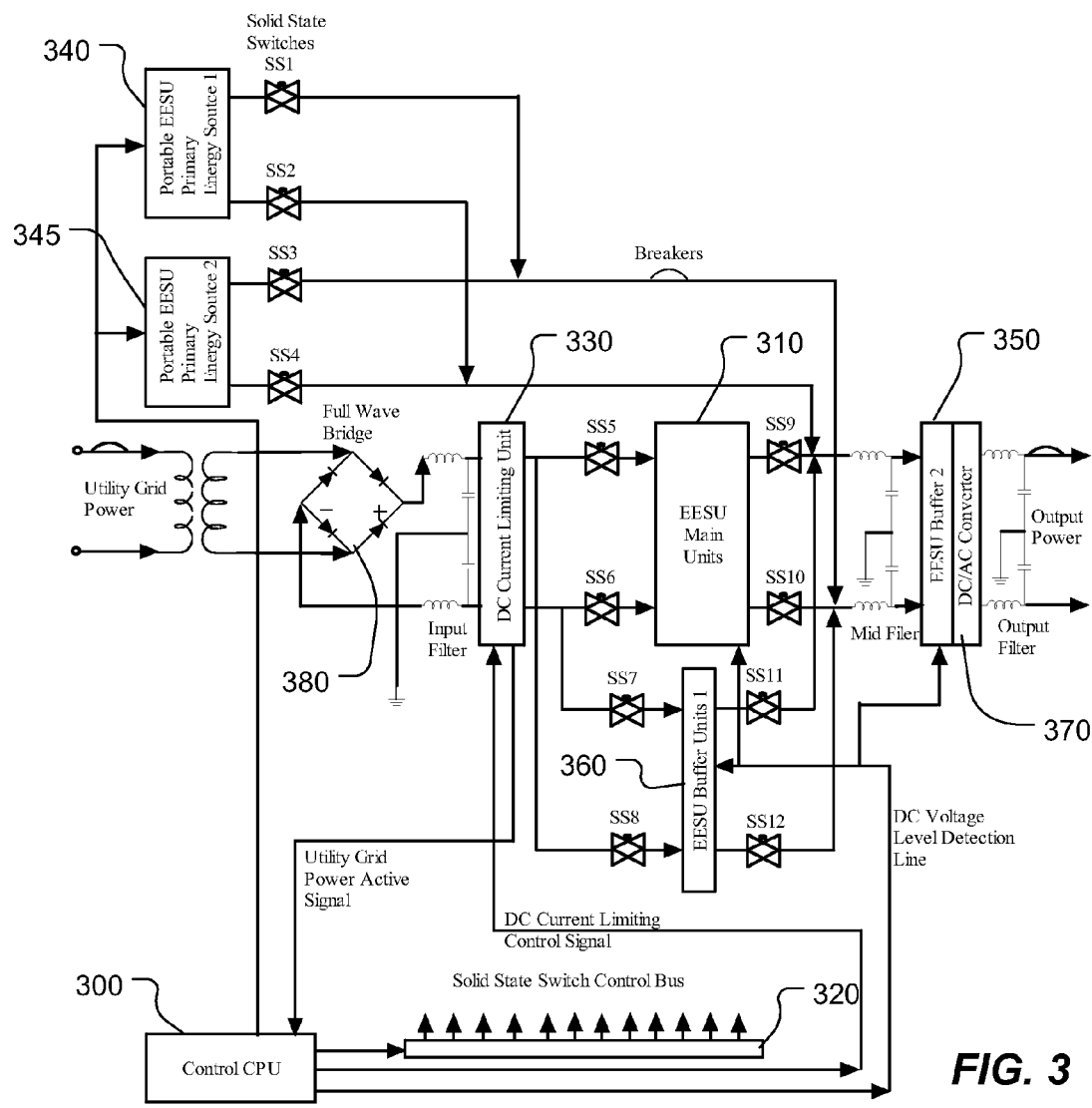
FIG. 3 is a system architecture wherein the capacitive electrical energy storage unit (main) is utilized to isolate the output power from the utility grid and to provide additional functions in a seamless manner.

The electrical energy storage units identified, for example, in FIG. 3, are fabricated utilizing an ultra-capacitor configuration. The ultra-capacitors can be fabricated utilizing a dielectric ceramic particulate, such as composition-modified barium titanate powder coated with aluminum oxide, and immersed in either a glass, such as calcium magnesium aluminosilicate glass, or a polymer matrix.

In an embodiment, an aspect of the EESU technology is the packaging of the components within a hermetically sealed metal box. If the point of use is located inland, then the metal may be Type 316 stainless steel to assist in reducing issues arising from exposure to the environment. If the point of use is located near or on salt water, then the metal may be titanium, which may reduce reaction to salt spray. Hermetic seals may assist with long-term life, >50 years, utilized by utility-grid companies.

System Design Features

As indicated in FIG. 3, the utility grid energy directly charges the EESU main unit 310 as a primary source of electrical energy to users in homes, commercial, and industrial sites. Aspects of the system may include automated utility grid power averaging, ultra effective isolation from power line noise and transients, utility grid primary power backup along with utilizing portable EESU based power delivery units for providing long term power backup capability, and real-time additions to the EESU main units 310 without disrupting the output power.

As illustrated in FIG. 3, power is received from a power source, such as a utility power grid, at a bridge 380, such as a full wave bridge. A DC current limiting unit 330 is connected to the bridge 380 via input filters. The EESU main unit 310 is connected to the DC current limiting unit 330 via solid state switches SS5 and SS6 and is connected to an EESU buffer 2 (350) via switches SS9 and SS10. In an example, an EESU buffer unit 1 (360) is connected in parallel with the EESU main unit 310 to DC current limiting unit 330 via solid state switches SS7 and SS8 and to the EESU buffer 2 (350) via solid state switches SS11 and SS12.

In the example illustrated, a DC/AC converter 370 is electrically coupled to the EESU buffer 2 (350). The DC/AC converter 370 is connected to the output power via output filters. In an example, the output power is connected to critical loads. In some embodiments, the output power can be connected to a portion of the utility power grid.

Portable power sources can also be connected to the system. For example, portable EESU sources (340 and 345) can be connected to the EESU buffer 2 (350) via solid state switched SS1, SS2, SS3, and SS4. In an example, such portable EESU power sources (340 and 345) can be used to supplement utility grid power.

A control computer 300 can control the system. In particular, control computer 300 can be connected to a control bus 320 for solid state switches to activate and deactivate the solid state switches of the system. Further, the control computer 300 can monitor aspects of the system, such as power levels of EESU units (e.g., 340, 345, 310, 350, and 360). In addition, the control computer 300 can monitor the utility grid power. Further, the control computer 300 can control the DC current limiting unit.

Many utility companies charge more for energy during the peak-demand times, which is usually from 2:00 PM to about 8:00 PM. During that time, the cost of energy increases significantly for each step-up in energy usage. For example, in homes and small businesses the off-peak cost for energy may be in the range of $0.05/kW·h and the peak cost may be $0.25/kW·h or higher. Industrial sites may range from $0.12/kW·h for the non-peak energy cost to $0.35/kW·h or higher in the peak energy demand times. Peak-demand energy costs have become a significant portion of the electrical bills for most users in the United States of America. Utility grid companies have many reasons for increasing the cost of energy in the peak-demand times, but whatever the reason, the increase in energy cost during the peak demand time continues and as the cost to produce energy increases, so does the peak cost.

In an embodiment, a system provides electrical energy users a method of averaging energy usage over a 24-hour period. The method is called power averaging or "peak shaving". The functionally aspects of power averaging are indicated in FIG. 3. In the power averaging mode, solid state switches (SS5, SS6, SS9, and SS10) are active and other solid state switches are inactive. The control computer 300 sets the input flow rate (kWh) from the utility grid that provides the user with sufficient energy for a 24-hour period to the EESU main unit 310 so that the stored electrical energy in this unit is not depleted to zero. Therefore, the EESU main units 310 may be configured to provide sufficient energy to the user during the peak demand time while the energy supplied by the utility grid is constant over the 24 hour power averaging period. However, if the energy in the EESU main unit 310 is depleted to a minimum set level, the control computer 300 may increase the system input energy flow rate so that the primary minimum energy storage level is maintained. If this condition continues the control computer 300 may order additional EESU main unit 310 storage which can be installed real time.

At the end of the peak energy demand period, the input energy may be sufficient to not only supply output energy demand but also recharge the EESU main units 310. As an example, an average home in the USA uses around 600 kWh per month. It is estimated that around 70% of the energy may be used in the peak demand period. On a yearly basis, 5,040 kWh of energy is used in the peak-demand period and 2,160 kWh may be consumed in the non-peak-demand period. The yearly cost in this example may be $1,260 for the peak-demand energy and the cost for the energy in the non peak demand period may be $108, with a year total cost of $1,368. With the power averaging unit, the total yearly cost may be $360, providing a yearly saving of $1,008. The estimated cost for the power averaging system for a home with this amount of energy usage may be in the range of $4,000 to $5,000. Of course, in the industrial utility-grid energy supply market, the cost of energy is higher and the difference between the non-peak costs and peak costs are significantly wider, the return on the investment may be much faster and the yearly saving may be significant.

In another embodiment, the architecture may be a primary power backup to provide continual power to the user in case the utility grid power is interrupted. If the control computer 300 detects an input power loss, SS5 and SS6 may be deactivated. Primary power source may be delivered by the EESU main units 310. If the energy in the EESU main units 310 is reduced to a set level, then the computer 300 may automatically notify the user and order portable EESU primary backup energy sources (340 and 345). The EESU specification data, as shown in Table II, indicates that electrical energy for the first time is highly portable due to the ultrahigh energy storage and ultralow discharge rate. If a trainload of EESUs is charged in west Texas and held in reserve for a year, only around 0.22% of the energy may be lost. With the use of the shipping, railroad, and trucking capabilities of the world, a truckload of portable EESU backup units could be readily delivered and continued to be delivered until the utility grid power loss has been corrected. When the computer 300 detects that portable EESU primary energy is desired, it may ensure that EESU Buffer 2 (350) is fully charged and may deactivate SS9 and SS10 and activate SS1 and SS2. The fully charged EESU Buffer 2 (350) ensures that the output power is not interrupted during the process of activating the portable energy source. If the computer 300 detects that the portable energy source 1 (340) energy level is depleted to a specified level, it may again ensure that the EESU buffer 2 (350) is fully charged and deactivate SS1 and SS2 and activate SS3 and SS4, which completes the action of activating portable EESU primary energy source 2 (345). This process of switching between portable energy source 1 (340) and 2 (345) continues until the control computer 300 detects that the utility grid power has been reactivated. The computer 300 may activate SS5 and SS6 and charge the EESU main units 310 up to an acceptable level. When that has been completed, the solid state switches associated with the portable power may be deactivated and SS9 and SS10 may be activated.

In another embodiment, the architecture may provide real time incremental changes to the EESU main unit 310 energy storage capability, sometimes called "hot swapping." This aspect can also be used to perform maintenance on the EESU main units 310. When the control computer 300 is notified to activate this aspect, it may first ensure that EESU buffers 1 (360) and 2 (350) are fully charged, then SS5, SS6, SS9, and SS10 may be deactivated. SS7, SS8, SS11, and SS12 may be activated. The computer 300 may increase the power delivery to a level that ensures that the EESU buffers 1 (360) and 2 (350) remain at full charge. When the computer is notified that the process has been completed, it may again ensure that the energy storage buffers are fully charged and deactivate SS7, SS8, SS11, and SS12 and activate SS5, SS6, SS9, and SS10.

Yet another feature of this architecture is the ability to provide energy of demand to selected locations on an intelligent utility grid. Such systems could be located at strategic location on computer controlled utility grids of the world and be fully charged so the grid energy could be delivered on demand to locations requiring critical electrical grid energy. In an example, the output power of the system is the utility grid. Such power averaging features allow for higher average energy outputs for the already existing utility grid power generating plants. Such an intelligent grid energy storage feature would allow for an increase in yearly output of approximately 40% to 45%.

The system architecture indicated in FIG. 3 is just one example of many that can perform the aspects of the system. The detailed design of these many enabling architectures can also be successful completed and provide the aspects of the system. In an example, the EESU described in U.S. Pat. Nos. 7,033,406 and 7,466,536 may be advantageously used as part of the system.

In a first aspect, a power system includes an input connected to a utility grid to receive alternating current (AC) input voltage, a full wave bridge electrically connected to the input and to provide full wave reactivation of the AC input voltage, an input filter electrically connected to the full wave bridge to provide direct current (DC) voltage, a DC current limiting unit electrically connected to the input filter to provide power to the system at a rate approximately a 24-hour average consumption rate, a main electrical energy storage unit electrically connected to the DC current limiting unit via a first set of solid state switches, a mid filter electrically connected to the main electrical energy storage units via a second set of solid state switches, an electrical energy storage unit buffer electrically connected to the mid filter, a DC/AC converter unit electrically connected to the mid filter, and an output filter electrically connected to the DC/AC converter unit.

In an example of the first aspect, the DC current limiting unit is to provide constant power output to the main electrical energy storage unit. In another example of the first aspect, the main electrical energy storage unit is a capacitive electrical energy storage unit to provide power on demand to the mid filter, the capacitive electrical energy storage unit to reduce utility grid line AC noise, transients, and short and long term drop outs.

In an additional example of the first aspect, the DC/AC converter unit is to convert DC voltage from the main electrical energy storage unit to utility grid acceptable voltages.

In a further example of the first aspect, the power system further includes a computational circuitry to control the first and second set of solid state switches or the DC current limiting unit to perform at least one of: adjusting the DC current limiting unit to change the power provided to the main electrical energy storage unit on an as needed basis; switching delivery of the output power from the main electrical energy storage unit to the electrical energy storage unit buffer and isolating the main electrical energy storage unit to permit adding, removing, or replacing capacitive electrical energy storage units of the main electrical energy storage unit; switching from the main electrical energy storage units to a portable electrical energy storage unit as a DC power source to the DC/AC converter unit; or providing a seamless delivery of power without loss of output power or adding switching noise to the output power.

In another example of the first aspect, the main electrical energy storage unit is an ultra capacitor configuration fabricated utilizing a composition-modified barium titanate powder coated with aluminum oxide and immersed in a calcium magnesium aluminosilicate glass or polymer matrix.

In a second aspect, a power system includes an input coupled to a utility power grid, a bridge electrically connected to the utility power grid and to convert alternating current to direct current, an electrical energy storage unit electrically connected to the bridge, the electrical energy storage unit comprising a dielectric layer disposed between first and second electrode layers, the dielectric layer comprising a high permittivity ceramic material, a converter electrically connected to the electrical energy storage unit and to convert direct current to alternating current, and a power output electrically connected to the converter.

In an example of the second aspect, the dielectric layer comprises the high permittivity ceramic material dispersed in a polymer matrix. In another example of the second aspect, the high permittivity ceramic material is coated with an aluminum oxide coating.

In a further example of the second aspect, the power system further includes a solid state switch electrically connected between the bridge and the electrical energy storage unit, and further comprising a control computer to control the solid state switch. The control computer can to control the converter.

In an additional example of the second aspect, the power system further includes an electrical energy storage unit buffer electrically connected between the electrical energy storage unit and the converter, the electrical energy storage unit buffer comprising a second dielectric layer disposed between third and fourth electrode layers, the second dielectric layer comprising a high permittivity ceramic material.

In another example of the second aspect, the power system further includes a portable electrical energy storage unit comprising a third dielectric layer disposed between fifth and sixth electrode layers, the third dielectric layer comprising a high permittivity ceramic material, the portable electrical energy storage unit electrically connected to the converter.

In an example of the second aspect, the power system further includes an electrical energy storage unit buffer electrically connected in parallel with the electrical energy storage unit, the electrical energy storage unit buffer comprising a fourth dielectric layer disposed between seventh and eighth electrode layers, the fourth dielectric layer comprising a high permittivity ceramic material.

In a third aspect, a method of power averaging includes receiving power from a utility grid at a bridge of a power system. The power system includes an input coupled to a utility power grid, the bridge electrically connected to the utility power grid and to convert alternating current to direct current, a current limiting circuit connected to an output of the bridge, an electrical energy storage unit electrically connected to the current limiting circuit, the electrical energy storage unit comprising a dielectric layer disposed between first and second electrode layers, the dielectric layer comprising a high permittivity ceramic material, a converter electrically connected to the electrical energy storage unit and to convert direct current to alternating current, and a power output electrically connected to the converter. The method further includes determining an average daily usage rate with a control computer and controlling current supplied by the current limiting circuit with the control computer based on the average daily usage rate.

In an example of the third aspect, controlling the current includes controlling the current to be constant based on the average daily usage rate. In another example of the third aspect, controlling the current includes controlling the current to fill the electrical energy storage unit during off-peak times.

In an additional example of the third aspect, the method further includes controlling access to portable energy storage units based on availability of utility grid power and power level of the electrical energy storage unit.

In a further example of the third aspect, the method further includes isolating the electrical energy storage unit and activating a buffer unit connected in parallel with the electrical energy storage unit.

In a particular example of the third aspect, the power output is connected to a portion of the utility grid.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A power system comprising:
   a bridge to convert alternating current to direct current, wherein the bridge has input terminals and output terminals, wherein the inputs are configured to be coupled to a utility grid;
   a first capacitor having a first terminal and a second terminal, wherein the first terminal of the first capacitor is coupled to an output terminal of the bridge, and the second terminal of the first capacitor is coupled to ground;
   a second capacitor having a first terminal and a second terminal, wherein the first terminal of the second capacitor is coupled to the second terminal of the first capacitor and ground, and the second terminal of the second capacitor is coupled to another output terminal of the bridge;
   a first switch coupled to first terminal of the first capacitor;
   a second switch coupled to the second terminal of the second capacitor;
   a main electrical energy storage unit having first and second input terminals and first and second output terminals, wherein:
      the first input terminal of the main electrical energy storage unit is coupled to the first switch;
      the second input terminal of the main electrical energy storage unit is coupled to the second switch; and
      the main electrical energy storage unit includes an electrical energy storage unit comprising a first dielectric layer disposed between first and second electrode layers, the first dielectric layer comprising a high permittivity ceramic material;
   a backup electrical energy storage unit having a first output terminal and a second output terminal;
   a third switch coupled to first output terminal of the backup electrical energy storage unit;
   a fourth switch coupled to the second output terminal of the backup electrical energy storage unit;
   an electrical energy storage unit buffer coupled to the first and second output terminals of the main electrical energy storage unit and the third and fourth switches;
   an output coupled to the electrical energy storage unit buffer;
   a control computer configured to determine that the electrically energy storage unit buffer has a sufficient charge, and in response to determining that the electrically energy storage unit buffer has a sufficient charge, to control the first and second switches to deactivate the main electrical energy storage unit, and to control the third and fourth switches to activate the backup energy storage unit.

2. The power system of claim 1, wherein the backup electrical energy storage unit comprises a portable electrical energy storage unit including a second dielectric layer disposed between third and fourth electrode layers, the second dielectric layer comprising a high permittivity ceramic material.

3. The power system of claim 1, further comprising:
   a DC/AC converter unit coupled between the main electrical energy storage unit and the output,
   wherein the bridge is a full wave bridge to provide full wave rectification of an AC input voltage received from the utility power grid.

4. The power system of claim 3, further comprising:
   an input filter coupled between the full wave bridge and the main electrical energy storage unit;
   a mid filter coupled between to the main electrical energy storage unit and the electrical energy storage unit buffer; and
   an output filter coupled between the DC/AC converter unit and the output.

5. The power system of claim 4, wherein the main electrical energy storage unit is a capacitive electrical energy storage unit to provide power on demand to the output and to reduce utility grid line AC noise, transients, and short and long term drop outs.

6. The power system of claim 1, further comprising a current limiting unit coupled between the input and the main electrical energy storage unit to the system.

7. The power system of claim 6, wherein the control computer is to control the switches or the current limiting unit to:

adjust the current limiting unit to change the power provided to the main electrical energy storage unit on an as needed basis;

providing a seamless delivery of power without loss of output power or adding switching noise to the output power; or any combination thereof.

8. The power system of claim 1, wherein the main electrical energy storage unit is an ultra capacitor configuration fabricated utilizing a composition-modified barium titanate powder coated with aluminum oxide and immersed in a calcium magnesium aluminosilicate glass or polymer matrix.

9. A power system comprising:

a bridge to convert alternating current to direct current, wherein the bridge has input terminals and output terminals, wherein the input terminals are configured to be coupled to a utility grid;

a first capacitor having a first terminal and a second terminal, wherein the first terminal of the first capacitor is coupled to an output terminal of the bridge, and the second terminal of the first capacitor is coupled to ground;

a second capacitor having a first terminal and a second terminal, wherein the first terminal of the second capacitor is coupled to ground, and the second terminal of the second capacitor is coupled to another output terminal of the bridge;

a main electrical energy storage unit coupled to the output terminals of the bridge, wherein the main electrical energy storage unit includes an electrical energy storage unit comprising a dielectric layer disposed between first and second electrode layers, the dielectric layer comprising a high permittivity ceramic material;

a first electrical energy storage unit buffer coupled in parallel with the main electrical energy storage unit;

a second electrical energy storage unit buffer coupled to the main electrical energy storage unit and the first electrical energy storage unit buffer;

an output coupled to the second electrical energy storage unit buffer;

switches including a first switch associated with the main electrical energy storage unit and a second switch associated with the first electrical energy storage unit buffer; and a control computer configured to determine that the second electrically energy storage unit buffer has a sufficient charge, and in response to determining that the second electrically energy storage unit buffer has a sufficient charge, to control the first switch to deactivate the main electrical energy storage unit, and to control the second switch to activate the second electrical energy storage unit buffer.

10. The power system of claim 9, wherein the control computer is to control the switches or to switch delivery of the output power from the main electrical energy storage unit to the first electrical energy storage unit buffer and isolating the main electrical energy storage unit to permit adding, removing, or replacing capacitive electrical energy storage units of the main electrical energy storage unit.

11. The power system of claim 9, wherein the control computer is configured such that after maintenance is performed, the control computer is further configured to control the second switch to deactivate the second electrical energy storage unit buffer, and to control the first switch to activate the main electrical energy storage unit.

12. The power system of claim 9, wherein the control computer is configured to determine that the first electrically energy storage unit buffer has a sufficient charge before deactivating the main electrical energy storage unit and activating the first electrical energy storage unit buffer.

13. The power system of claim 9, wherein the first dielectric layer comprises the high permittivity ceramic material dispersed in a polymer matrix.

14. The power system of claim 13, wherein the high permittivity ceramic material is coated with an aluminum oxide coating.

* * * * *

UNITED STATES PATENT AND TRADEMARK OFFICE
CERTIFICATE OF CORRECTION

PATENT NO. : 8,788,109 B2  Page 1 of 1
APPLICATION NO. : 13/401136
DATED : July 22, 2014
INVENTOR(S) : Richard D. Weir et al.

It is certified that error appears in the above-identified patent and that said Letters Patent is hereby corrected as shown below:

In the Claims

Column 10, line 21, please delete "to first output" and insert --to the first output--
Column 10, line 30 and 31, please delete "electrically energy" and insert --electrical energy--
Column 10, line 32, please delete "electrically" and insert --electrical--
Column 10, line 53, please delete "between to the main" and insert --between the main--
Column 12, line 8, please delete "electrically" and insert --electrical--
Column 12, line 10, please delete "electrically" and insert --electrical--
Column 12, line 29, please delete "electrically" and insert --electrical--

Signed and Sealed this
Twenty-first Day of April, 2015

Michelle K. Lee
*Director of the United States Patent and Trademark Office*